US005993941A

United States Patent [19]

Vasiliev et al.

[11] Patent Number: 5,993,941

[45] Date of Patent: Nov. 30, 1999

[54] COMPOSITE TRANSVERSE WING RIB AND APPARATUS FOR PRODUCING FLAT CELLULAR-RIBBED STRUCTURE THEREOF

[75] Inventors: Valery Vitalievich Vasiliev, Moscow; Alexandr Fedorovich Razin, Moskovskaya obl. g. Khotkovo; Vladimir Alexeevich Salov, Moscow; Vladimir Alexandrovich Bunakov, Moscow; Sergey Alexandrovich Soldatov, Moscow; Leonid Pavlovich Zakharevich, Moskovskaya obl. g. Sergiyev Posad, all of Russian Federation; Michael Voldman, Santa Ana, Calif.

[73] Assignees: Centr Perspektivnykh Razrabotok Khutkovo, Moscow Region, Russian Federation; McDonnell Douglas Corporation, Huntington Beach, Calif.

[21] Appl. No.: 08/999,402

[22] Filed: Dec. 29, 1997

[30] Foreign Application Priority Data

May 6, 1997 [RU] Russian Federation ............. 97107376

[51] Int. Cl.[6] ................................ B23B 1/00; A01J 25/12

[52] U.S. Cl. .......................... 428/178; 428/116; 428/169; 428/175; 425/335; 425/383; 52/793.1

[58] Field of Search .................................... 428/167, 188, 428/178, 172, 40.1, 105, 113, 171, 175, 169, 190; 425/335, 383, 397, 403; 244/123, 125, 126; 52/783.1, 793.1

[56] References Cited

U.S. PATENT DOCUMENTS

| | | | |
|---|---|---|---|
| 4,137,354 | 1/1979 | Mayes, Jr., et al. . | |
| 4,284,679 | 8/1981 | Blad et al. . | |
| 5,364,686 | 11/1994 | Disselbeck et al. | 428/174 |
| 5,372,868 | 12/1994 | Prewo et al. | 428/167 |
| 5,393,588 | 2/1995 | Weddendorf | 428/125 |

FOREIGN PATENT DOCUMENTS

| | | |
|---|---|---|
| 880778 | 11/1981 | Russian Federation . |
| 1643171 | 4/1991 | Russian Federation . |
| 1107459 | 12/1991 | Russian Federation . |
| 1775309 | 11/1992 | Russian Federation . |

OTHER PUBLICATIONS

Engineering Applications Of Composites, 1978, vol. 3, pp. 145–150.

Filament Winding: Its Development, Manufacture, Applications and Design, D. Rasato, C. Giore, 1969, pp. 114–125.

Wound Glass–Reinforced Plastics, v. Kalinchev, M. Makarov, 1986, pp. 188–204.

*Primary Examiner*—Donald Loney
*Attorney, Agent, or Firm*—Alston & Bird LLP

[57] ABSTRACT

A composite transverse wing rib shaped as a multi-layered flat panel comprises a cellular-ribbed structure of intersecting rectlinear ribs whose lengthwise directions are angled in opposite directions at oblique angles to a longitudinal dimension of the wing rib. The ribs have widthwise directions that extend between opposite side surfaces of the cellular-ribbed structure. The cellular-ribbed structure includes projections having flat faces arranged on an outer frame of the structure. The wing rib also includes other layers overlying opposite side surfaces of the cellular-ribbed structure and the projections. The outer layers comprise a net of intersecting small composite belts oriented along the oppositely angled directions of the rectilinear ribs and intersecting at the cross intersections of the rectlinear ribs. The cellular-ribbed structure and outer layers are formed of high-module yarns bound by a polymer binder. An apparatus for making a wing rib comprises a base having a flat surface on which are mounted a plurality of oppositely angled rod-shaped members each defining a channel therein such that a system of intersecting channels are formed for receiving intersecting layers of strips of composite material. The apparatus also includes pins mounted on the outer periphery of the base, about which the strips of composite material are wrapped to form the projections on the cellular-ribbed structure.

7 Claims, 6 Drawing Sheets

12

11

COMPOSITE TRANSVERSE WING RIB AND APPARATUS FOR PRODUCING FLAT CELLULAR-RIBBED STRUCTURE THEREOF

BACKGROUND OF THE INVENTION

The invention relates to the branch of aeronautical engineering and may be used in airborne vehicles, particularly in an airborne vehicle wing, and more particularly, the invention concerns a composite transverse wing rib.

Creation and improvement of airborne vehicles are accompanied by continuous development of an airborne vehicle wing that carries aerodynamic and vibratory multicycle loads. An airborne vehicle is considered as the most effective if it is capable of carrying maximum payloads, has minimum weight, low aviation fuel consumption and long-range feature. An airborne vehicle wing should also comply with the requirements of high strength resistance, reliability and efficiency, said airborne vehicle wing being a volumetric long-length construction including an outer casing, longitudinal spars and transverse wing ribs as well as their fastening members. A composite transverse wing rib is a complex construction made as a flat multi-layered panel.

Therefore, the designing of composite transverse wing ribs is performed with maximum use of properties of materials and their effective distribution between load-carrying surfaces.

Known in the art is a composite transverse wing rib made as a flat multilayered panel comprising a flat cellular-ribbed structure in a middle layer and outer layers respectively made of high module yarns and a polymeric binder (U.S. Pat. No. 5,393,588, NPC 423-175, 1995).

Said transverse wing rib construction uses the conventional approach to create it as a multi-layered structure perceiving a load without functional distribution of forces among component members.

Selected as a transverse wing rib in other prior art composite wing structure was a three-layered structure using aluminum honeycomb filler and using an epoxy boroplastic for a casing (Composite Materials, ed. by L. Broutman, R. Krock, vol 3, "Engineering Applications of Composites", ed. by B. Norton, Moscow, Mashinostroenie, 1978, pp. 145–150, FIGS. 10–13).

This structure perceives force loads by outer boro-plastic layers. However, the reliability of joining the boro-plastic layers to the honeycomb filler is problematic because of low strength of adhesives and the imperfection of the honeycomb filler.

Another multi-layered panel comprising outer layers and mutually intersecting and members in a middle layer provides increase of the specific strength and rigidity in non-uniform loading due to introduction of additional rod members to form trihedral prisms and due to fastening the rod members together at intersection nodes (USSR Inventor's Certificate No. 1,107,459, B 64 C 3/26, 1991).

This panel has limited abilities to implement continuous yarn systems for effective operation under tension/compression conditions.

The closest prior art of a composite transverse wing rib is U.S. Pat. No. 5,393,588, NPC 423-175, 1995.

The present Application provides an apparatus for producing a flat cellular-ribbed structure of a composite transverse wing rib. The invention of this apparatus was caused by structural features of the transverse wing rib and operating techniques of producing thereof. The reason to create this apparatus was that the prior art apparatus and producing methods do not allow to produce the transverse wing rib of the present Application.

Known in the art is an apparatus for producing a flat cellular-ribbed structure of a composite transverse wing rib, said apparatus comprising a base having a flat surface with operating pins mounted thereon and yarn placers (USSR Inventor's Certificate No. 880,778, B 24 D 3/02, 1981).

Other prior art apparatus use a base shaped as special mandrels and a yarn placer (B. A. Kalinichev, M. S. Makarov "Namotannyje Stekloplastiki", Moscow, Khimiya, 1986, p.188–204; D. Rosato, C. Grove Jr "Filament Winding", Moskva, Mashinostroyeniye, 1969,p.114–125).

Known in the art also is production of cellular-ribbed structures shaped as composite shells by winding a reinforcing material pre-impregnated with a polymeric binder on a mandrel with enveloping of operating lock pins and equalizing of the tension through rib layers due to moving mandrel sections along a rotation axis of the mandrel by a power mechanism (USSR Inventor's Certificate No. 1,643, 171, B 29 C 53/56, 1991 and No. 1,775,309, B 29 C 53/56, 1992).

Said means do not allow to obtain flat cellular-ribbed structures because to produce them a tooling shaped as a body of revolution is used, that is, a mandrel having lock pins mounted at its ends. A tooling of other design is necessary to obtain flat cellular-ribbed structures of a panel type.

The closest prior art of the apparatus for producing a ribbon cellular structure of a transverse wing rib is the technical solution of the Specification to USSR Inventor's Certificate No. 880,778.

SUMMARY OF THE INVENTION

The main object of the present invention is to provide a composite transverse wing rib based on high module yarns and a polymeric binder, said composite transverse wing rib having minimum mass and high rigidity, strength and reliability under conditions of a complex tension state of an airborne vehicle wing.

The main object and the technical result are accomplished by altering the construction of the composite transverse wing rib on the basis of new conception of distributing and perceiving loads within layers of its structure and their interaction with each other, and producing a cellular-ribbed structure of a composite transverse wing rib.

For this purpose, a composite transverse wing rib shaped as a flat multilayered panel comprises a layer of a flat cellular-ribbed structure and outer layers respectively made of high module yarns and a polymeric binder, wherein the flat cellular-ribbed structure is provided with crossing-over rectilinear ribs of carbon fibers, arranged tilted in opposite directions and being integral with projections having flat faces and arranged on a contour of the structure. The transverse wing rib outer layers encompassing the flat cellular-ribbed structure and the projections at their faces with fitting to its side surfaces are shaped as a net of small belts of organic yarns arranged to have the similar tilt of an opposite direction and intersection as the rectilinear ribs of the cellular-ribbed structure. The outer layers of the multi-layered panel are fastened to its flat cellular-ribbed structure by a plasto-elastic binder, such as rubber or polyurethane, and a division film of a material having anti-adhesion properties, such as fluoroplastic, may be placed between the outer layers of the multi-layered panel and its flat cellular-ribbed structure.

In other embodiment of a composite transverse wing rib shaped as a flat multi-layered panel comprising a flat cellular-ribbed structure in a middle layer and outer layers respectively made of high module yarns and a polymeric binder the flat cellular-ribbed structure is provided with intersecting rectilinear ribs of carbon fibers, arranged tilted in opposite directions and being integral with projections having flat faces and arranged on a contour of the structure, and the outer layers encompassing the flat cellular-ribbed structure and the projections thereon at their faces with fitting to its side surfaces are shaped as a net of flat spirals of organic yarns turns of which are arranged with the similar tilt of an opposite direction and intersection as the rectilinear ribs of the flat cellular-ribbed structure.

In addition, the object of the invention is to create an apparatus for producing a flat cellular-ribbed structure of a transverse wing rib. The present apparatus allows to produce the transverse wing rib having the required properties according to the present invention.

To obtain a flat cellular-ribbed structure of a composite transverse wing rib, the apparatus for producing thereof comprises a base having a flat surface and pins mounted therein, a frame having a system of open crossing-over rectilinear channels for shaping therein rectilinear ribs of the flat cellular-ribbed structure, and a yarn placer. Said frame includes rod-shaped members having rectilinear channels and rings mounted on the flat surface of the base, wherein the rod-shaped members having the rectilinear channels are joined together at places of their intersection and fixed in respective profile recesses of said rings, and the pins are mounted on a perimeter of the frame beyond it and according to a direction of the rectilinear channels.

Said features of the composite transverse wing rib and the apparatus for producing its flat cellular-ribbed structure are essential, because each of them separately and together are directed to solve the set problem and to achieve new technical result.

The manufacture of the rectilinear ribs of the flat cellular-ribbed structure as intersecting ribs arranged tilted in opposite directions provides maximum under-load use of all fibers from which the ribs are produced. The arrangement of the ribs along and across the transverse wing rib is not advantageous, because the transverse ribs will be overloaded and the longitudinal ones will be under-loaded, that allows to detect the reserve of ineffective use of the material. The manufacture of the flat cellular-ribbed structure of the transverse wing rib with the projections on its contour that are integral with the rectilinear ribs allows to create a closed structural system to perceive and transmit large loads to the transverse wing rib. The flat cellular-ribbed structure of the transverse wing rib, having the intersecting rectilinear ribs arranged in opposite directions allows to create such load-carrying structures with a wide range of rib tilt for various load levels, in comparison with which the solutions known from the prior art have no such advantages. In addition, the proposed construction of the flat cellular-ribbed structure of the transverse wing rib allows to decrease essentially the production cost.

Under bending or compression of the transverse wing rib its flat cellular-ribbed structure is deformed with non-essential changes of its geometric parameters. To increase the load-carrying capacity of the transverse wing rib in perceiving these loads, the outer layers are shaped as a net of small belts or a net of flat spirals of organic yarns, said belts or spirals encompassing the flat cellular-ribbed structure of the transverse wing rib and perceiving tension loads. The cellular-ribbed structure made of carbon fibers effectively perceives compressing or bending loads. When separating inter-layers of a material having anti-adhesion properties, such as fluoroplastic, are introduced between the belts and the cellular-ribbed structure of the transverse wing rib, the belts perceive tension loads and are capable of moving relatively to the flat cellular-ribbed structure. When separating inter-layers, such as rubber or polyurethane, are introduced between the belts and the flat cellular-ribbed structure, the belts further can perceive shearing forces as a result of changing the geometric parameters of the flat cellular-ribbed structure of the transverse wing rib.

The fitting of the small belts or flat spirals to the side surfaces of the cellular-ribbed structure of the transverse wing rib decreases in overall dimensions in thickness. The manufacture of the projections on the contour of the cellular-ribbed structure of the transverse wing rib allows to distribute the carbon filters uniformly in the rectilinear ribs and the organic yarns in the belts or flat spirals of the outer layers across a transverse wing rib area and to achieve minimum weight characteristics of the composite transverse wing rib capable of carrying maximum loads.

To obtain the flat cellular-ribbed structure of the transverse wing rib having such unique properties, the apparatus for producing thereof is provided with a frame having a system of open crossing-over rectilinear channels. The frame allows to provide the accuracy of placing undirected yarns into the rectilinear channels, the solidity and predetermined geometric profile of yarns, thus realizing their unique properties. If the frame is absent in the apparatus, the resulting cellular-ribbed structure has no accurate geometric dimensions along its ribs, the solidity is absent, the structure cannot perceive increased loads. The manufacture of the frame of the rod-shaped members and rings constituting it allows to assemble or disassemble the frame rapidly for any dimensions of the flat cellular-ribbed structure of the transverse wing rib, and to provide compact storage of the rod-shaped members and rings on small production areas.

Said essential features of the composite transverse wing rib and the apparatus for producing its flat cellular-ribbed structure are novel because their use in the prior art is not found, that allows to define the proposed technical solutions as complying with the criterion of 'novelty' in the combination of novel and universally known essential features.

The unified combination of novel essential features and universally known essential features in the proposed technical solutions allows to solve the set problem and to achieve new technical result, that defines the proposed technical solutions by the essential distinctions from the prior art.

It is possible to produce said cellular-ribbed structure of the transverse wing rib having the above properties using only the proposed apparatus the aspects of which is the presence of the frame having the system of open mutually intersecting recesses and the rod-shaped members having rectilinear channels and rings to fix said members. Such design of the apparatus allows to mount and dismount the frame easily during the production of the transverse wing rib. These features of design of the apparatus allows a multiple use of the said apparatus.

Novel constructions of the transverse wing rib and the apparatus for producing the cellular-ribbed structure of the transverse wing rib are the result of development and design works and creative investment, are obtained without using standard design solutions or any recommendations in this branch of art, are original technical solutions non-evident for a person skilled in the art and comply with the criterion of 'inventive step.'

The invention will now be described in greater detail with reference to the drawings.

DETAILED DESCRIPTION OF THE INVENTION

Figure 1:
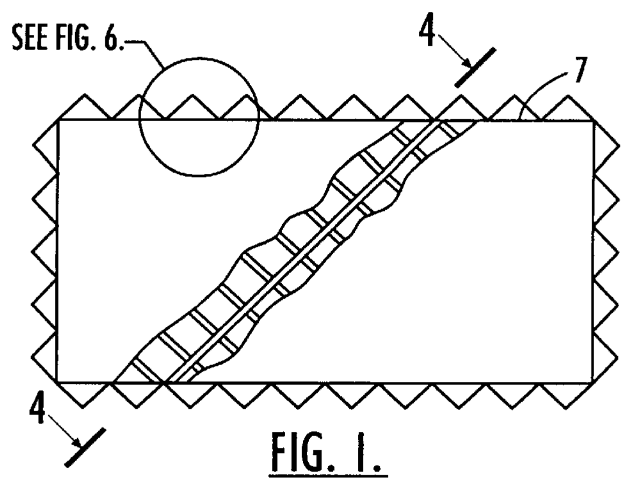
FIG. 1 is a general (plan) view of a composite transverse wing rib.
Figure 2:
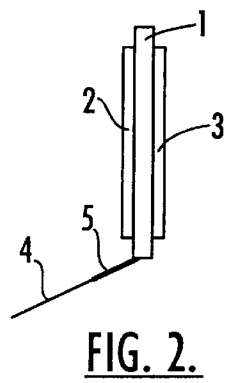
FIG. 2 is a side view.
Figure 3:
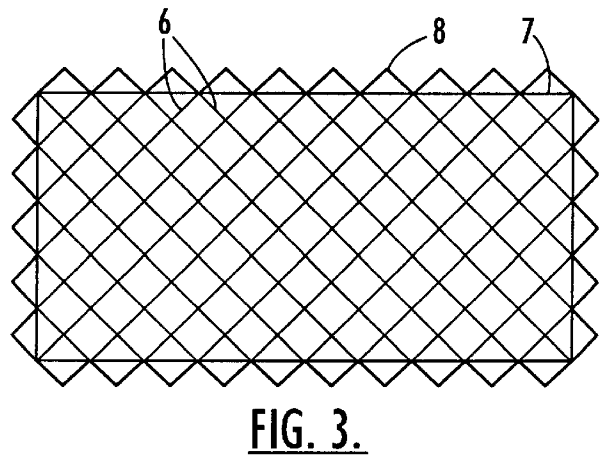
FIG. 3 is a view of a flat cellular-ribbed structure of the transverse wing rib.
Figure 4:
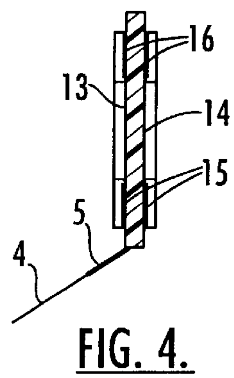
FIG. 4 is a cross-sectional view taken along the line IV—IV and showing a small belt.
Figure 5:
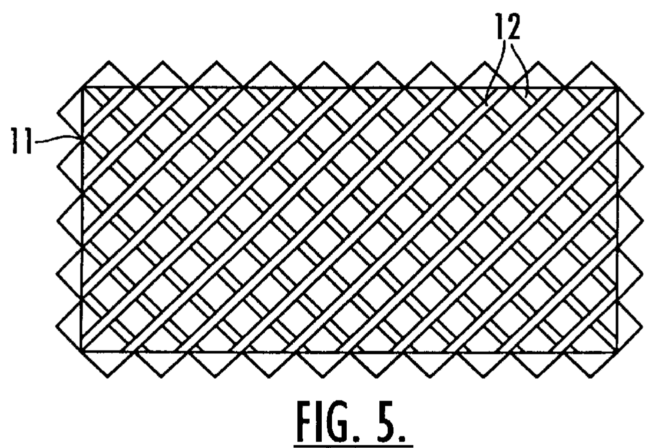
FIG. 5 shows an outer layer of the transverse wing rib as a net of small belts.
Figure 6:
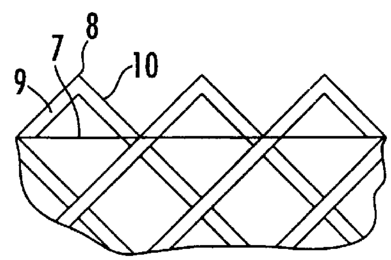
FIG. 6 shows projections on a contour of the transverse wing rib.
Figure 7:
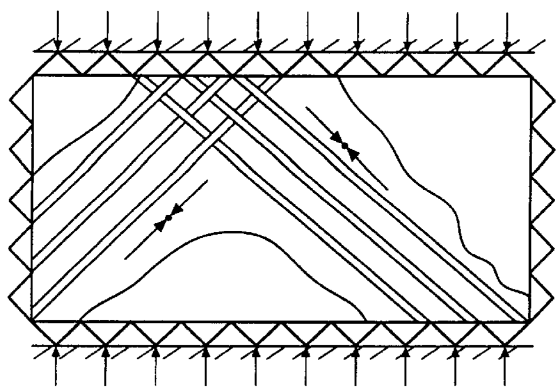
FIG. 7 shows a stress and deformation state diagram for compression of the transverse wing rib having the structure of FIG. 3.
Figure 8:
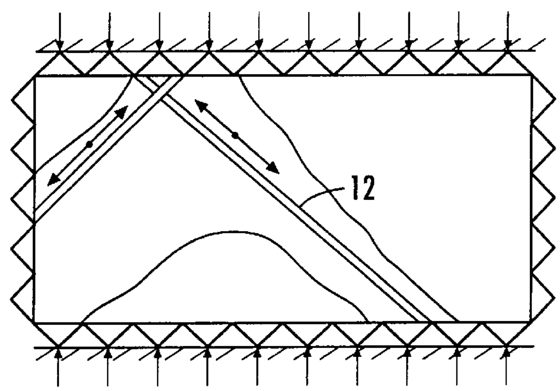
FIG. 8 shows a stress and deformation state diagram for bending of the transverse wing rib having the structure of FIG. 3.

A composite transverse wing rib (FIGS. 1–8) comprises a layer of a flat cellular-ribbed structure 1 and outer layers 2, 3 made respectively of high module yarns and a polymeric binder designated by reference numerals 4 and 5. The flat cellular-ribbed structure 1 is provided with cross-intersecting rectilinear ribs 6 arranged tilted in opposite directions and made of carbon fibers, said ribs being integral with projections 8 having flat faces 9, 10 and arranged on an outer periphery or contour 7 of the structure 1. The outer layers 2, 3 of the transverse wing rib are made as a net 11 of small belts 12 of organic yarns, said small belts being arranged with the similar tilt of an opposite direction and intersection as the rectilinear ribs 6 of the flat cellular-ribbed structure 1 and encompassing the flat cellular-ribbed structure 1 and the projections 8 at their faces 9, 10 with fitting to side surfaces 13, 14 of the structure. The outer layers 2, 3 of the transverse wing rib may be fastened to the flat cellular-ribbed structure 1 by a plasto-elastic binder 15, such as rubber or polyurethane. Separating films 16 of a material having anti-adhesion properties, such as fluoroplastic, may be positioned between the small belts 12 constituting the net 11 of the outer layers 2, 3 and the flat cellular-ribbed structure.

Figure 9:
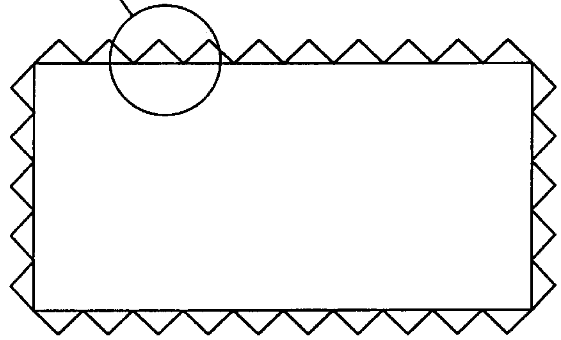
FIG. 9 is a general (plan) view of other embodiment of the composite transverse wing rib.
Figure 10:
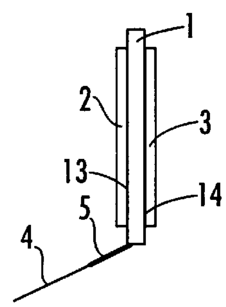
FIG. 10 is a side view.
Figure 11:
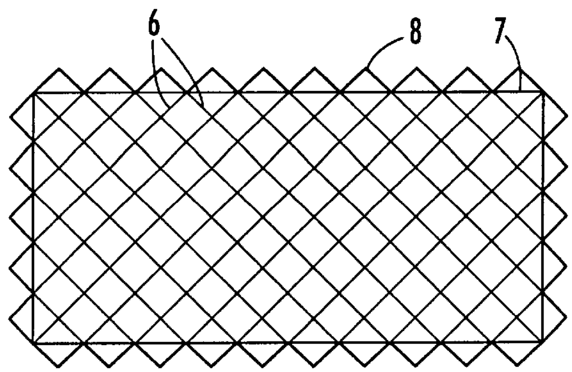
FIG. 11 is a view of a flat cellular-ribbed structure of the transverse wing rib of FIG. 9.
Figure 12:
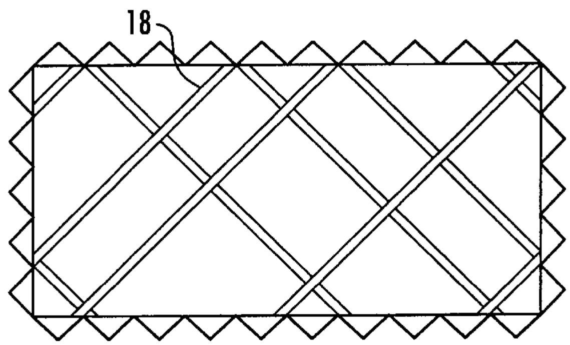
FIG. 12 is a lay-out diagram of flat spirals encompassing the cellular-ribbed structure of the transverse wing rib.
Figure 13:
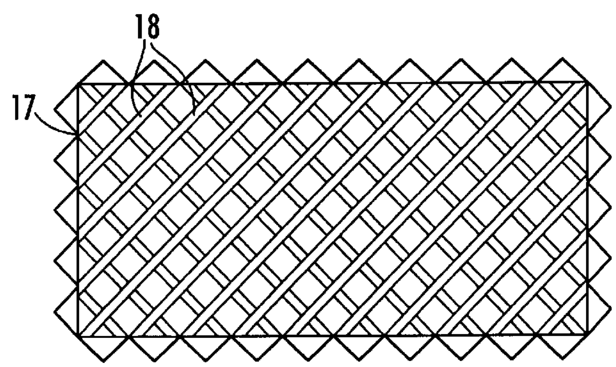
FIG. 13 shows an outer layer of the transverse wing rib as a net of flat spirals.
Figure 14:
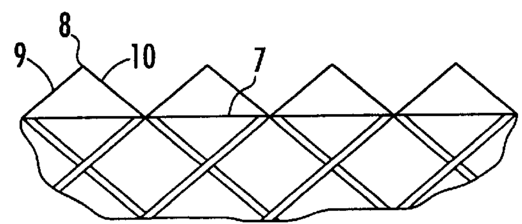
FIG. 14 is an enlarged view of the diagram of encompassing profile projections by flat spirals, said profile projections being arranged on a contour of the cellular-ribbed structure of the transverse wing rib.
Figure 15:
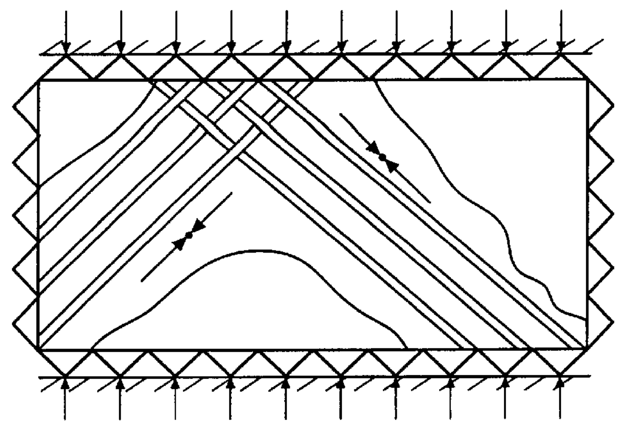
FIG. 15 is a stress and deformation state diagram in compression of the transverse wing rib having the structure of FIG. 11.
Figure 16:
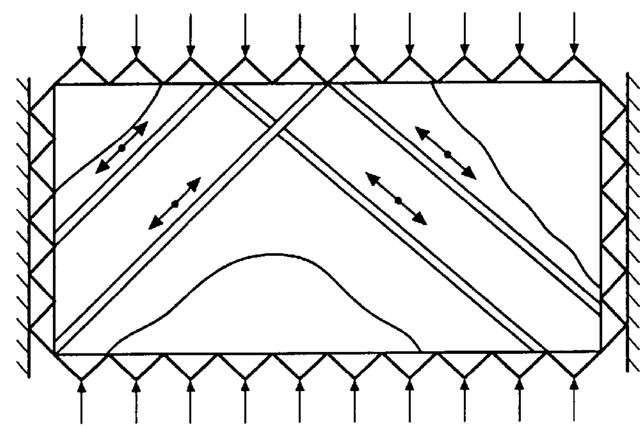
FIG. 16 is a stress and deformation state diagram in bending of the transverse wing rib having the structure of FIG. 11.

Other embodiment of a composite transverse wing rib as shown in FIGS. 9–16 and comprises a layer of a similar flat cellular-ribbed structure 1 and outer layers 2, 3 made respectively of high module yarns 4 and a polymeric binder 5. The flat cellular-ribbed structure 1 is provided with intersecting rectilinear ribs 6 arranged tilted in opposite directions and made of carbon fibers and being integral with projections 8 having flat faces 9, 10 and arranged on a contour 7 of the structure 1. The outer layers 2, 3 of the transverse wing rib are made as a net 17 of flat spirals 18 of organic yarns, said flat spirals being arranged with the similar tilt of an opposite direction and intersection as the rectilinear ribs 6 of the flat cellular-ribbed structure 1 and encompassing the flat cellular-ribbed structure 1 and the projections 8 thereon at their faces 9, 10 with fitting to side surfaces 13, 14 of the structure.

Figure 17:
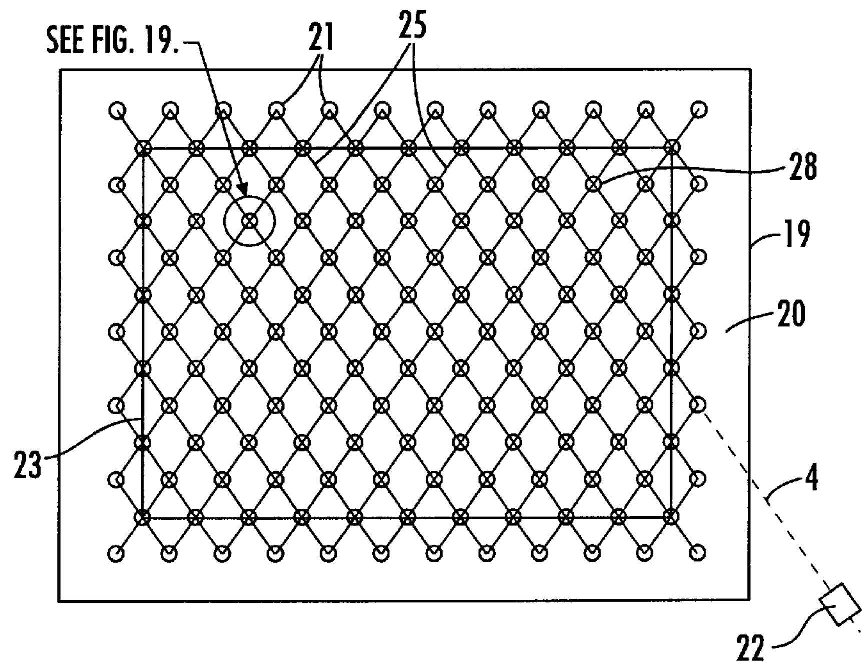
FIG. 17 is a general (plan) view of an apparatus for producing a flat cellular-ribbed structure of a composite transverse wing rib.
Figure 18:
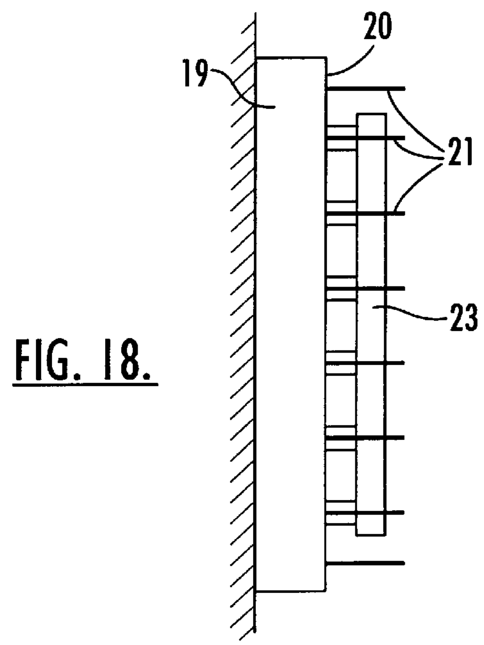
FIG. 18 is a side view.
Figure 19:
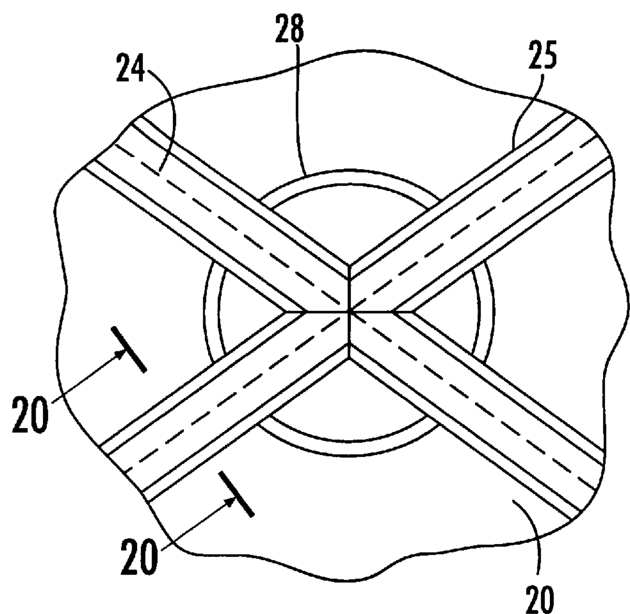
FIG. 19 shows a joint node of rectilinear rod-shaped members of a frame (on an enlarged scale)
Figure 20:
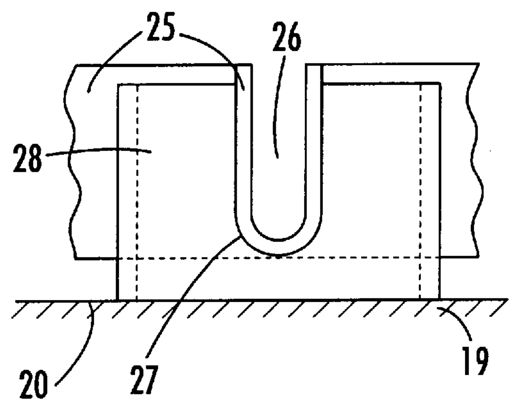
FIG. 20 is a cross-sectional view of a rectilinear rod-shaped member of the frame, said cross-sectional view being taken along the line XX—XX.

An apparatus (FIGS. 17–20) for producing the flat cellular-ribbed structure 1 of the composite transverse rib according to any one of said embodiments comprises a base 19 having a flat surface 20, operating pins 21 mounted on the flat surface and a yarn placer 22. The apparatus is provided with a flat frame 23 having a system of open crossing-over rectilinear channels 24 for shaping the rectilinear ribs 6 of the structure 1 in said channels, said frame being made of crossing-over rectilinear rod-shaped members 25 having rectilinear channels 26 butted at the places of intersection and fixed in respective profile recesses 27 of rings 28 mounted on the flat surface 20 of the base 19, and the pins 21 are mounted on the perimeter of the frame 23 beyond it and according to a direction of the rectilinear channels 24.

The apparatus is used to produce therewith flat cellular-ribbed structures 1 for composite transverse wing ribs. The assembling of the apparatus is performed as follows: the rectilinear rod-shaped members 25 are fixed at the places of their intersection in the respective profile recesses 27 of the rings 28 to form the frame 23 having the system of the crossing-over rectilinear channels 24, said frame 23 is mounted with the rings 28 onto the flat surface 20 of the base 19. Then the carbon fibers impregnated with the polymeric binder are placed by the yarn placer 22 into the rectilinear channels 24 of the frame 23 while changing the direction of their placement according to an respective program using the pins 21 mounted on the perimeter of the frame 23 beyond it and according to a direction of the rectilinear channels 24, said placement continuing so long as said channels become fully filled. Upon filling the channels 24 with the carbon fibers the base 19 and the frame 23 are positioned into a chamber (not shown) for thermal treatment of the resulting work-piece of the flat cellular-ribbed structure 1 of the transverse wing rib, the work-piece being treated in said chamber according to the modes of polymerizing the polymeric binder used to produce said work-piece. Upon the thermal treatment the material stocks are cut to form the projections 8 around the flat cellular-ribbed structure 1. Then the stocks formed around the pins 21 are removed, the flat cellular-ribbed structure 1 together with the frame 23 are extracted, the rings 28 and the rectilinear rod-shaped members 25 are extracted, and the burrs are trimmed from the flat cellular-ribbed structure 1.

The production of the composite transverse wing rib consists in applying organic yarns according to a determined program onto a flat cellular-ribbed structure 1 produced from carbon fibers and a polymeric binder to form outer layers 2, 3 thereon as a net 11 and 17 of intersecting small belts 12 or flat spirals 18 arranged tilted to opposite sides as well as rectilinear ribs 6 of the flat cellular-ribbed structure 1. Thus, it is possible to obtain various embodiments of composite transverse wing ribs either fastened by a polymeric binder used to produce a flat cellular-ribbed structure with a plasto-elastic binder 15, such as rubber or polyurethane, or without the fastening of the outer layers 2, 3 to the cellular-ribbed structure 1 and with introduction of a separating film of a material having anti-adhesion properties, such as fluoroplastic, between the layers 2, 3 and the structure 1.

The composite transverse wing ribs produced using new technical solutions were tested for compression and bending according to the diagrams of FIGS. 7, 8 and FIGS. 15, 16. The test results are positive, the transverse wing ribs have not subjected to any destruction and have high strength and rigidity.

The realization of the present invention allows to obtain high quality transverse wing ribs for a wing of airborne vehicles.

Thus, new technical solutions disclosed above are novel, easily producible and effective in the construction realization as compared with the prior art.

The scope of the assumed invention should be understood in wider extent than the embodiments stated in the description, set of claims and drawings. It is necessary to bear in mind that the above constructions according to the present invention represent only the preferred embodiments because it is possible to use various modifications in the shape, dimensions and arrangement of individual members within the scope of the inventions stated in the claims.

In addition, the proposed inventions do not limit the use of composite transverse wing ribs in airborne vehicles and may be used in other branches where it is necessary to use them as panels having higher strength and reliability and other properties described in the present Application materials, for example, as partitions in shipbuilding and so on.

What is claimed is:

1. A composite transverse wing rib shaped as a flat multi-layered panel, comprising:

a flat cellular-ribbed structure of intersecting rectilinear ribs having lengthwise directions tilted in opposite directions at oblique angles to a longitudinal dimension of the composite transverse wing rib, the ribs having widthwise directions that extend between opposite side surfaces of said cellular-ribbed structure, said cellular-ribbed structure including projections having flat faces arranged on an outer frame of said cellular-ribbed structure and being integral with said cellular-ribbed structure, said cellular-ribbed structure being constructed of a plurality of high module yarns of carbon fibers with a polymeric binder; and outer layers overlying said opposite side surfaces of and encompassing the flat cellular-ribbed structure and the projections thereon at their faces, said outer layers being shaped as a net of intersecting small belts arranged along the oppositely tilted lengthwise directions of the rectilinear ribs and intersecting at the cross intersections of the rectilinear ribs of the flat cellular-ribbed structure, said outer layers being constructed from a plurality of high module organic yarns with a polymeric binder.

2. A composite traverse wing rib according to claim 1 wherein the outer layers are fastened to the flat cellular-ribbed structure by a plasto-elastic binder.

3. A composite transverse wing rib according to claim 1 wherein a separating film of a material having anti-adhesion properties is positioned between the outer layers and the flat cellular-ribbed structure.

4. A composite transverse wing rib shaped as a flat multi-layered panel, comprising:

a flat cellular-ribbed structure of intersecting rectilinear ribs having lengthwise directions tilted in opposite directions at oblique angles to a longitudinal dimension of the composite transverse wing rib, said structure including projections having flat faces arranged on its contour and being integral with it, said structure being formed of a plurality of high module yarns of carbon fibers with a polymeric binder; and outer layers encompassing the flat cellular-ribbed structure and the projections thereon at their faces and fitting to side surfaces of the structure, said outer layers being shaped as a net of intersecting flat spirals arranged along the oppositely tilted directions of the rectilinear ribs and intersecting at the intersections of the rectilinear ribs of the flat cellular-ribbed structure, said outer layers being formed of a plurality of high module organic yarns with a polymeric binder.

5. A composite transverse wing rib according to claim 4 wherein the outer layers are fastened to the flat cellular-ribbed structure by a plasto-elastic binder.

6. A composite transverse wing rib according to claim 4 wherein a separating film of a material having anti-adhesion properties is positioned between the outer layers and the flat cellular-ribbed structure.

7. An apparatus for producing a flat cellular-ribbed structure of a composite transverse wing rib, comprising:

a frame defined by a base having a flat surface, a plurality of rings having recesses and mounted on a flat surface of the base with the recesses facing away from the flat surface, and a plurality of intersecting rectilinear rod-shaped members fixed in the respective recesses of said rings, said rings being positioned at the places of intersection of the rectilinear rod-shaped members, a frame made of said crossing-over rectilinear rod-shaped members and said rings mounted on the flat surface of the base;

said rod-shaped members including channels which extend therealong and which intersect to form a system of open crossing-over rectilinear channels made on the crossing-over rectilinear rod-shaped members of the frame;

pins mounted on the flat surface of the base outward of and adjacent the perimeter of the frame and located according to directions defined by the rectilinear channels of the rectilinear rod-shaped members; and a yarn placer.

* * * * *